March 23, 1965 | R. CHAPMAN | 3,175,046

ELECTRICAL AMPLIFIERS

Filed Dec. 18, 1961 | 3 Sheets-Sheet 1

Inventor
Roger Chapman

By [signature]
Attorney

March 23, 1965

R. CHAPMAN 3,175,046

ELECTRICAL AMPLIFIERS

Filed Dec. 18, 1961

3 Sheets-Sheet 2

Inventor
Roger Chapman

By [signature]
Attorney

March 23, 1965 R. CHAPMAN 3,175,046

ELECTRICAL AMPLIFIERS

Filed Dec. 18, 1961 3 Sheets-Sheet 3

*Inventor*
Roger Chapman

By

*Attorney*

3,175,046
ELECTRICAL AMPLIFIERS

Roger Chapman, Kent, England, assignor to International Standard Electric Corporation, New York, N.Y., a corporation of Delaware Filed Dec. 18, 1961, Ser. No. 160,110
Claims priority, application Great Britain, Dec. 22, 1960, 44,127/60
6 Claims. (Cl. 179—81)

This invention relates to electrical amplifiers, and to equipment using such amplifiers. An example of such equipment is an intercommunication system comprising a plurality of stations wherein each station comprises a microphone and amplifier in the transmitting channel and an amplifier and loudspeaker in the receiving channel, i.e. wherein each station may be defined as a telephone subscriber's station.

According to one feature of the present invention there is provided an electrical amplifier, in which the gain of the said amplifier is controllable in accordance with the level of the input to the said amplifier, thus providing forward automatic-gain-control, and in which the gain of the said amplifier is also controllable in accordance with the level of the output from the said amplifier, thus providing reverse automatic-gain-control.

The present invention will be described mainly in its application to intercommunication systems wherein the number of subscribers' stations is of the order of ten and there are complete conference facilities, and in addition in its application to such systems wherein several of the stations may be in close proximity.

If, for example, the system had fifty stations, the requirement of full conference facilities would imply that there could be a fifty to one variation of line impedance. The loudspeaker amplifiers would be adjusted to give their required output for a particular value of voltage input and so the microphone amplifier would have to maintain an output of this same value of voltage for a possible fifty to one variation of line impedance.

Another problem with which this invention is concerned is one which is common to all intercommunication systems using stations of the loudspeaking telephone type, i.e. with the microphone and loudspeaker of any one station in close proximity to each other there would be liability to "howling" due to acoustic feedback unless the loudspeaker was muted whenever the microphone was live.

In systems such as those described above where several of the stations may be in close proximity, there would be in addition, always the possibility of "howling" due to the acoustic feedback from one station to another when connected together. This implies that the gain from one microphone to another loudspeaker would have to be kept between fairly narrow limits. If the gain were too high, then howling would result; if too low, then the receiving level would be inadequate.

It is an object of the present invention to provide an improved intercommunication system which substantially overcomes or mitigates the problems which have been described above.

According to a further feature of the present invention there is provided a telephone subscriber's station which comprises a transmitting channel and a receiving channel and in which there is a microphone and a transmitting amplifier in the transmitting channel and a receiving amplifier and a loudspeaker in the receiving channel, and in which the transmitting amplifier there is provided both forward and reverse automatic-gain-control.

According to a still further feature of the present invention there is provided a telephone subscriber's station as described in the preceding paragraph and in which the gain of the receiving amplifier is controlled by the transmitting amplifier thereat so that as the gain of the transmitting amplifier is increased, that of the receiving amplifier is decreased.

Also according to the invention there is provided an intercommunication system which comprises a plurality of stations as described in the two preceding paragraphs and an intercommunicating network of lines whereby each station can communicate with any other station of the said plurality or any combination thereof under substantially uniform conditions of transmission quality.

A microphone amplifier can be arranged to maintain a constant output voltage, irrespective of the line impedance, by making its output impedance very much lower than the line impedance. However, in the present instance this method is inadmissible as the output impedance of the microphone amplifier will shunt the line for incoming signals. At any one station the microphone and loudspeaker amplifiers are effectively in parallel across the line. Since the combined impedance must be of a standard value, the lowest permissible output impedance of the microphone amplifier is also this standard value when the loudspeaker amplifier would have to have an infinite impedance i.e. the lowest possible output impedance of the microphone amplifier is, for example, fifty times the lowest value of the line impedance, which occurs when a fifty station system is on full group working.

Theoretically, it is possible to maintain the line impedance constant by always padding it out to this lowest value obtained on full group working, such padding being switched in automatically according to the type of working required. However, this system is impracticable owing to its enormous complexity in the present case.

It would appear, therefore, that the only method of maintaining a constant line voltage irrespective of the line impedance, is to use an automatic-gain-control (A.G.C.) system in which the control voltage is proportional to the line voltage. This will certainly overcome the problems due to line impedance. However, it introduces further problems due to acoustic feedback from the loudspeaker of one station into the microphone of an adjacent station. For in the absence of a signal, the gain of an A.G.C. controlled amplifier will rise to its maximum value. Now in the present case of, say, fifty stations it has been shown that the output impedance of the microphone amplifier cannot be less than the above-mentioned standard value. Thus the gain of the amplifier without A.G.C. will change by about 30 db as the load impedance varies from its value for full group working to its value for single station working i.e. the standard value. Thus in the absence of signal when the A.G.C. is inoperative on a standard value line the gain of the amplifier will rise by about 30 db over its required value, since the gain has to be adjusted to be satisfactory on a full group working line. However, as has been shown above, in a system where there is close proximity of stations, the gain must lie within fairly close limits in order to prevent "howling" and thus 30 db increase in gain would certainly result in "howling."

It is to meet this problem that the present amplifier system has been designed.

Advantages obtained with the further mentioned feature of the present invention are that the transmitting amplifier has a low gain in the absence of an input signal, and a high gain with constant output voltage independent of the input signal level and the output load for medium and high input signal levels.

There is also the problem, which has been mentioned above, of feedback from the loudspeaker of a station into its own microphone.

It would be possible to prevent the microphone amplifier feeding into its own loudspeaker amplifier by means of a hybrid coil, but owing to the large variation in line impedance this is impracticable. Padding out the line sufficiently to enable a good rejection to be obtained would result in an intolerably high loss.

Another method is to fit a press-to-speak switch on the microphone which, when pressed, connects the microphone circuit and at the same time mutes the loudspeaker. This is a perfectly practical arrangement, but it is desirable that the muting of the loudspeaker occurs automatically on speaking into the microphone. The present amplifier system also provides for this automatic muting of the loudspeaker.

In substations according to the present invention control voltages are derived solely from the transmitting channel. This is in contradistinction to many loudspeaking intercommunication systems known in the art where control voltages at a station are derived from both the transmitting and the receiving channels.

An embodiment of the present invention will now be more particularly described with reference to the accompanying drawings, in which.

Figure 1:
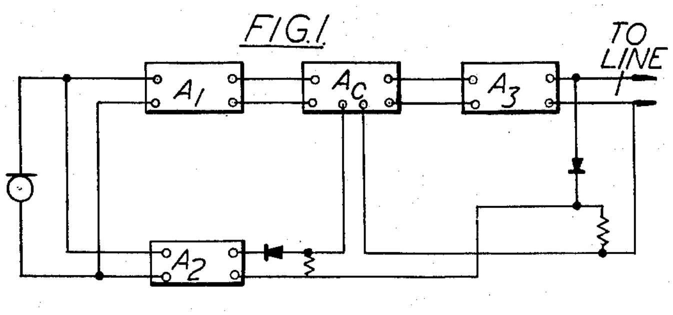
FIG. 1 shows a block schematic of a microphone amplifier according to the present invention.

In FIG. 1 there is shown an amplifier $Ac$ whose gain can be controlled by a D.C. bias voltage. $A_1$ is a fixed gain amplifier to raise the signal level before application to $Ac$. $A_3$ is a fixed gain amplifier to feed into the line. $A_2$ is a fixed gain amplifier, the output of which is rectified thus giving a negative D.C. voltage proportional to the input voltage. We define the application of the D.C. voltage from $A_2$ to $Ac$ as forward A.G.C. The output of $A_3$ is also rectified to produce a positive D.C. voltage proportional to the output voltage. We define the application of the D.C. voltage from $A_3$ to $Ac$ as reverse A.G.C. These two D.C. voltages are added in series and the resultant applied as the control voltage to $Ac$. The polarity of these control voltages is arranged to be such that increasing the signal input voltage increases the gain of $Ac$, whereas increasing the signal output voltage decreases the gain of $Ac$. In the absence of a signal and, hence, of any control voltage, the gain of $Ac$ is arranged to be low. Thus in the absence of a signal there is no danger of the system "howling."

When a signal is fed into the microphone a voltage is produced by $A_2$ which increases the gain of $Ac$. The larger the input voltage the greater will be the control voltage produced by $A_2$. However, the gain of $Ac$ cannot be increased indefinitely owing to the effect of the control voltage fed back from the output of $A_3$ which tends to reduce the gain of $Ac$.

The operation of the circuit is best understood by a mathematical analysis. It will be assumed that the gain of $Ac$ is directly proportional to the applied control voltage. In practice this in unlikely to be strictly correct but the assumption is justified by results and greatly simplifies the analysis, and though the results obtained will only be approximate, the general conclusions will be valid.

Thus if $Vc$ is the control voltage, and using the amplifier symbols for their gains, then $$Ac=KVc \qquad (1)$$

where K is constant.

If $E_1$ is the input voltage and $E_0$ the output voltage $$E_0=A_1A_cA_3E_1 \qquad (2)$$

Substituting (1) in (2):

$$E_0=A_1KV_cA_3E_1 \qquad (3)$$

Also $$V_c=A_2E_1-E_0 \qquad (4)$$

Substituting (4) in (3)

$$E_0=A_1K(A_2E_1-E_0)A_3E_1$$

i.e.

$$E_0=1+A_1KA_3E_1=A_1KA_2A_3E_1^2 \qquad (5)$$

$$E_0=\frac{A_1KA_3A_2E_1^2}{1+A_1KA_3E_1}$$

when $E_1$ is small, $$E_0=A_1KA_2A_3E_1^2$$

i.e. the overall gain of the amplifier, $$A=\frac{E_0}{E_1}$$

is given by $$A=A_1KA_2A_3E_1 \qquad (6)$$

i.e. for small input signals the gain is proportional to the input signal.

For $E_1$ large, from (5) we have $$E_0=A_2E_1 \qquad (7)$$

i.e.

$$A=A_2 \qquad (8)$$

Thus for large input signals, the gain is constant and is independent of the gain of the amplifiers $A_1$ and $A_3$. Now the gain $A_3$ depends on the line impedance, so the fact that for large input signals A is independent of $A_3$ means that under these conditions the voltage gain of the microphone amplifier is independent of the line impedance. Thus there is obtained an amplifier whose gain is low in the absence of a signal, and which rises to a predetermined value independent of the line impedance when a signal of sufficient amplitude is applied. In this way, the amplifier ensures that the output level shall be independent of the line impedance and that acoustic feedback shall not occur between adjacent stations.

A slight elaboration of the above circuit is possible and in the present system is desirable. This consists in making the $A_2$ amplifier limit at some predetermined input level. When the input level exceeds this value, then the control voltage applied to $Ac$ will only vary with $E_0$ i.e., the circuit becomes a normal A.G.C. one and so the output voltage $E_0$ will be maintained at a constant level independent of the input level. In the present case this is desirable so that the sending level is independent of the level of the speaker's voice.

Suppose the output voltage of $A_2$ is limited to a value $E_L$. Then from Equation 5 we see that when $E_1$ is small as before $$A=A_1KA_2A_3E_1 \qquad (6)$$

when $E_1$ is large, if $A_1KA_3E_1>1$ but $A_2E_1<E_L$ then also, as before, $$A=A_2 \qquad (8)$$

and if the input signal is increased so that $A_2E_1>E_L$ $$E_0=E_L \qquad (9)$$

i.e. the output voltage will be constant, independent of the input voltage and of the load impedance.

However, if $A_2E_1>E_L$ whilst $A_1KA_3E_1<1$ $$A=A_1KA_3E_L$$

i.e. the gain will be independent of the input voltage but in this region will depend on the output load, since $A_3$ is dependent on the load.

The provision that the muting of the loudspeaker occurs automatically on speaking into the microphone can be arranged quite readily with the present system. The voltage which controls the gain of the microphone amplifier can also be used to control the gain of the loudspeaker amplifier in the opposite sense, so that as the gain of the microphone amplifier is increased that of the loudspeaker amplifier is decreased and vice versa.

The voltage used to control the loudspeaker amplifier may either be identical with that controlling the microphone amplifier or it may only consist of the output of the $A_2$ amplifier. In the former case, when the gain of the microphone amplifier is reduced due to A.G.C. action under a strong signal, the gain of the loudspeaker amplifier will be increased which will be desirable in some cases. On the other hand, since the output of the $A_2$ amplifier depends on the line impedance, with this arrangement variations in line impedance will affect the gain of the loudspeaker amplifier.

If the output of the $A_2$ amplifier only is used for controlling the gain of the loudspeaker amplifier, then this will only depend on the speech level at the microphone and not on the line conditions. For the present system this method is adopted as being preferable.

Some circuit details of the complete amplifying system will now be given with reference to FIGS. 2 and 3.

Figure 2:
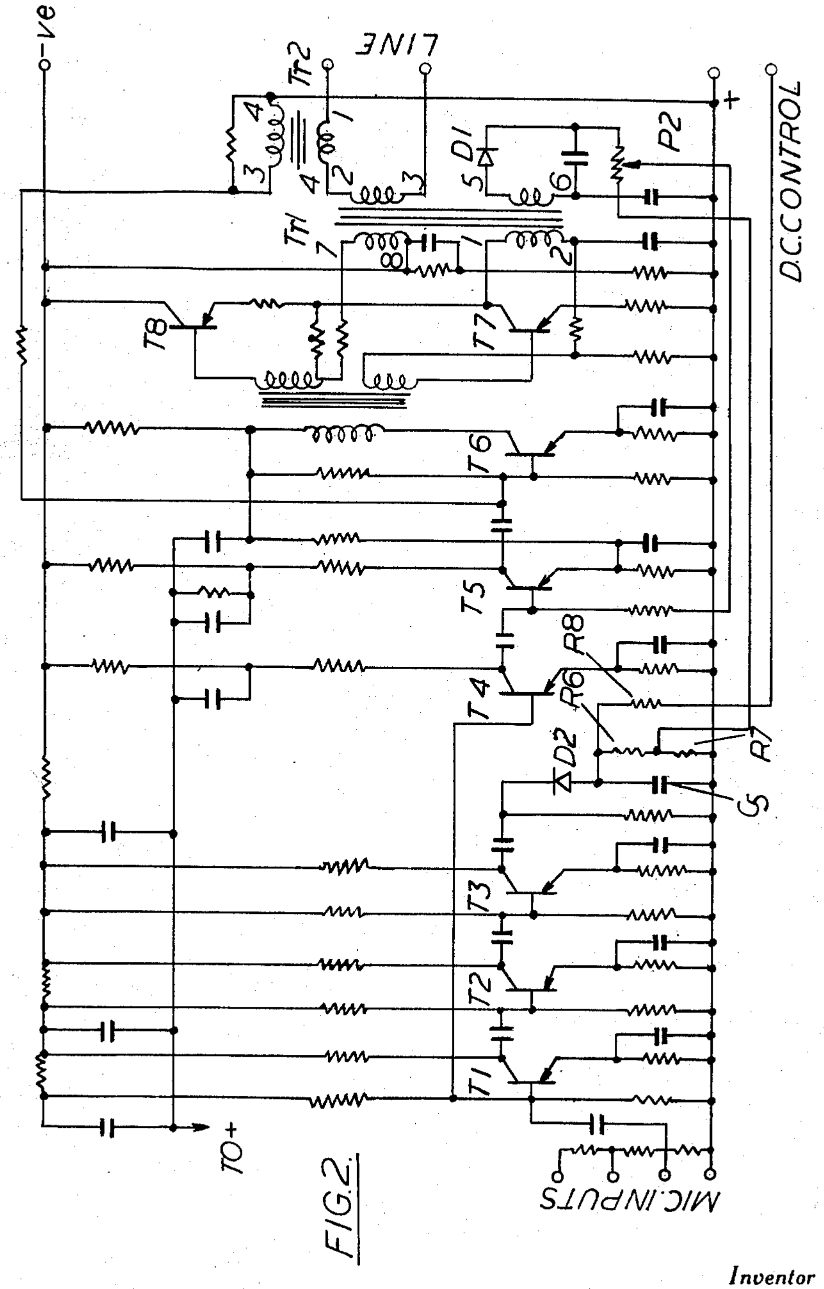
FIG. 2 shows the circuit details of the microphone amplifier.

In the microphone amplifier circuit of FIG. 2, the transistors $T_1$, $T_2$ and $T_3$ are included in a conventional RC coupled amplifier designed to raise the signal level sufficiently to provide an adequate control voltage. This amplifier is $A_2$ of FIG. 1. The output of this amplifier is rectified by diode $D_2$ to produce a negative control voltage, which is filtered by capacitor C5. The value of this capacitor is rather critical. If it is too large the control voltage is unable to increase rapidly with the result that the first syllable of a sentence may be clipped. If it is too small then, with the single-ended control circuits used in these amplifiers, the rapid change of control voltage can give an undesirable audio signal. Also under these latter conditions, a distorted version of the signal appears on the control voltage and this can produce undesirable distortion of the signal in the controlled transistor.

Transistor $T_4$ is also connected in a conventional RC coupled circuit and provides the signal amplifier $A_1$ of FIG. 1. Transistor $T_5$ provides the gain-controlled stage $A_C$ of FIG. 1. This stage will be further discussed at a later stage in the description. The control voltage applied to the base of $T_5$ is the sum of the voltage developed by $D_2$ attenuated by resistors $R_6$ and $R_7$, and the A.G.C. voltage developed by $D_1$, at the output.

Transistors $T_6$, $T_7$ and $T_8$ form a conventional power amplifier $A_3$, the output transistors $T_7$ and $T_8$ being connected as a Class B single-ended push-pull stage. The A.G.C. control voltage is obtained by rectifying the output of the tertiary winding 5–6 on the output transformer, TR1, by the diode $D_1$. The amount of this voltage fed to the controlled stage can be adjusted by a potentiometer $P_2$. Negative feedback proportional to the output and tending to increase the output impedance is provided via a transformer TR2.

The control voltage for the loudspeaker amplifier is taken from the output of the diode $D_2$ via resistor $R_8$.

Figure 3:
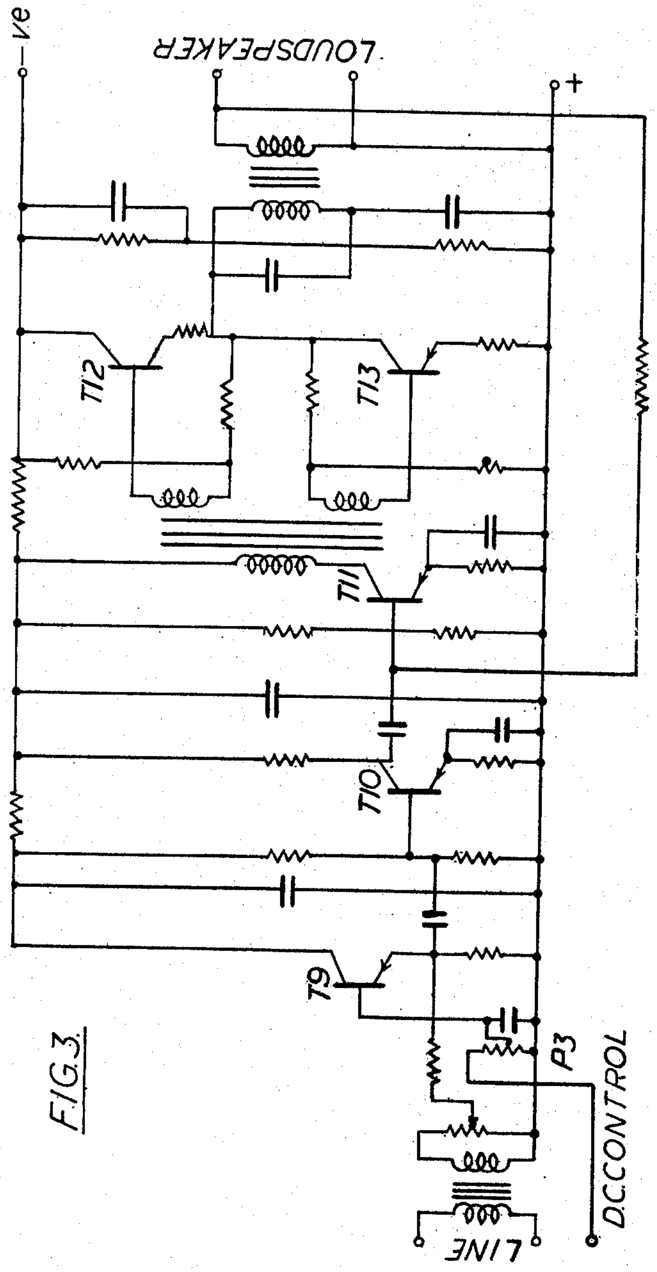
FIG. 3 shows the circuit details of a loudspeaker amplifier according to the present invention.

In the loudspeaker amplifier circuit of FIG. 3, transistor $T_9$ is the controlled stage. This stage will be further discussed at a later stage of the description. The amount of control voltage applied to the transistor $T_9$ can be varied by means of a potentiometer $P_3$. The transistors $T_{10}$, $T_{11}$, $T_{12}$ and $T_{13}$ are connected in a conventional power amplifier circuit, $T_{12}$ and $T_{13}$ being arranged as a Class B single-ended push-pull stage.

Some further discussion of the controlled stages involving the transistors $T_5$ and $T_9$ will now be given:

In any normal audio frequency transistor, $h_r$, the voltage feedback ratio with input open circuited, is very small and $h_o$, the output admittance with input open circuited, is much smaller than the external load. Under these conditions it may be shown that in both grounded emitter and grounded base operation, the voltage gain and input impedance of a transistor may be varied by varying the emitter current. The emitter current may be varied by applying the control voltage either to the base or emitter of the transistor. Normally it will be applied to the base, since the power required is then much less than when applied to the emitter.

The transistor may be used in two distinct ways as a gain control device:

(1) It may be used as a gain controlled amplifier, the base or emitter input being fed from a low impedance source, so that the input voltage is practically independent of the input impedance, and the output being taken from the collector.

(2) The base-emitter input resistance can be used as one element in an attenuator network, so that the attenuation can be varied by varying the emitter current of the transistor.

Figure 4:
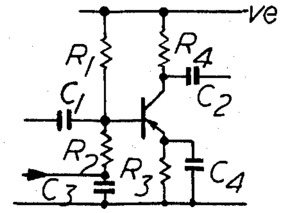
FIGS. 4 and 5 show examples of the use of a transistor as a gain controlled device.

Referring now to FIG. 4, this shows a grounded emitter amplifier stage with the emitter current, and hence the voltage gain, controlled by varying the base bias. The signal input is via $C_1$. The base bias voltage is determined by the resistors $R_1$ and $R_2$ and the control voltage which is applied to the bottom end of $R_2$. $C_3$ is to decouple the control voltage and may not always be necessary. The emitter current for a given base voltage is determined by $R_3$ which is decoupled by $C_4$ to prevent unwanted negative feedback. $R_4$ is the collector load on the transistor and the output is taken from the collector via $C_2$. In this circuit, as the control voltage is made more positive, so the emitter current is reduced, and hence the gain of the stage is also reduced. The transistor $T_5$ of the transmitting amplifier is connected as shown in FIG. 4.

Figure 5:
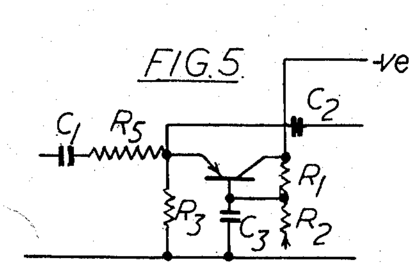

Referring now to FIG. 5, the input impedance of the transistor is used as the shunt element of an attenuator. The signal input is taken via $C_1$ and the output via $C_2$, both capacitors being used to block off the D.C. bias on the transistor. $R_5$ is the series resistor of the attenuator. The transistor is in the grounded base configuration. The bias and control arrangements are as in FIG. 4. In this circuit as the control voltage is made more negative so the input impedance of the transistor is reduced and consequently the attenuation is increased. The transistor $T_9$ of the receiving amplifier is connected as shown in FIG. 5.

All the circuits described in the present invention have been drawn using p-n-p transistors. They will operate equally well with n-p-n transistors provided the polarity of the supply voltage is reversed.

It is to be understood that the foregoing description of specific examples of this invention is not to be considered as a limitation on its scope.

What I claim is:

1. A telephone subscriber's station adapted for use with a transmission circuit having variable impedances comprising a transmitting channel and a receiving channel, said transmitting channel comprising microphone means for converting audio sound to audio electrical input signals, transmitter amplifier means for coupling said microphone to said transmission circuit, said transmitter amplifier means comprising an automatic gain control amplifier, first control means in said transmitter amplifier means operated responsive to said input signals for converting a portion of said input signals to a first D.C. control voltage proportional to said input signals, second control means operable responsive to said variations in impedances for converting a portion of the output signal of said transmitter amplifier means to a second D.C. control voltage proportional to said impedance variations, means for combining said first and second control voltages, and means for applying said combined voltages to said automatic gain control amplifier to provide a constant output signal to said transmission circuit independent of said impedance variations.

2. In the telephone subscriber's station of claim 1 wherein said transmitter amplifier also comprises a first amplifier of fixed gain, for coupling said microphone to said automatic gain control amplifier.

3. In the telephone subscriber's station of claim 2 wherein said first control means comprises a second amplifier of fixed gain.

4. In the telephone subscriber's station of claim 3 wherein said second control means comprises an output amplifier of fixed gain providing the final output voltage of said transmitting amplifier to said transmission circuit.

5. In the telephone subscriber's station of claim 4, wherein said receive channel comprises receiver amplifier means, means for muting said receiver amplifier and means for connecting said first D.C. control voltage to said muting means to mute said receiving channel when said transmitting channel is used.

6. A telephone subscriber's station adapted for use with a conference call circuit having variable line impedances, said station comprising a transmitting channel and a receiving channel, said receiving channel comprising receiver amplifier means, means for controlling the gain of said receiver amplifier, said transmitting channel comprising a microphone for providing input signals, first amplifier means having a fixed gain for amplifying said input signals, second amplifier means having a fixed gain operated responsive to said input signals for providing first gain control signals proportional to said input signals, automatic gain control amplifier means for controllably amplifying the signals from said first amplifier, third amplifier means for amplifying signals from said automatic gain controlled amplifier to provide an output signal, means for converting a portion of said output signals to second gain control signals which are a function of said variable impedances, means for combining said first and second gain control signals, means for connecting said combined gain control signals to control the gain of said automatic gain controlled amplifier, and means for connecting said combined gain control voltage to said means for controlling said receiver amplifier gain to mute said receiver amplifier when said transmit channel is used.

References Cited by the Examiner

UNITED STATES PATENTS

| | | | |
|---|---|---|---|
| 2,314,851 | 3/43 | Barney et al. | 330—136 X |
| 2,432,878 | 12/47 | Frederick et al. | 330—136 |
| 2,692,306 | 10/54 | Hathaway et al. | 330—136 X |

ROBERT H. ROSE, *Primary Examiner.*

WILLIAM C. COOPER, *Examiner.*